May 8, 1934.  G. G. O'NEILL  1,958,169
AUTOMOBILE
Filed Oct. 21, 1931  3 Sheets-Sheet 1
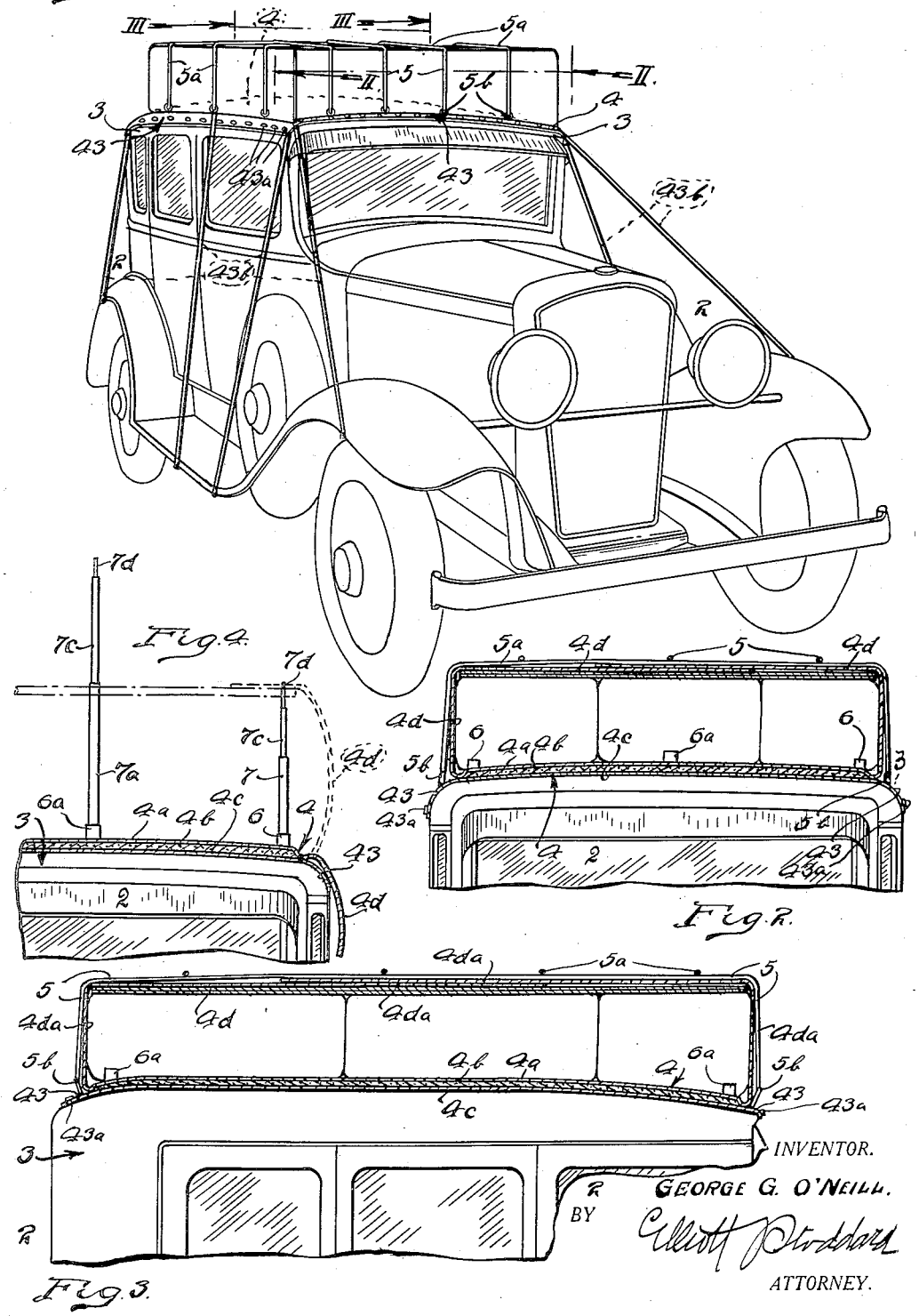

May 8, 1934. G. G. O'NEILL 1,958,169
AUTOMOBILE
Filed Oct. 21, 1931 3 Sheets-Sheet 2

INVENTOR.
GEORGE G. O'NEILL.
BY
ATTORNEY.

May 8, 1934.  G. G. O'NEILL  1,958,169
AUTOMOBILE
Filed Oct. 21, 1931   3 Sheets-Sheet 3
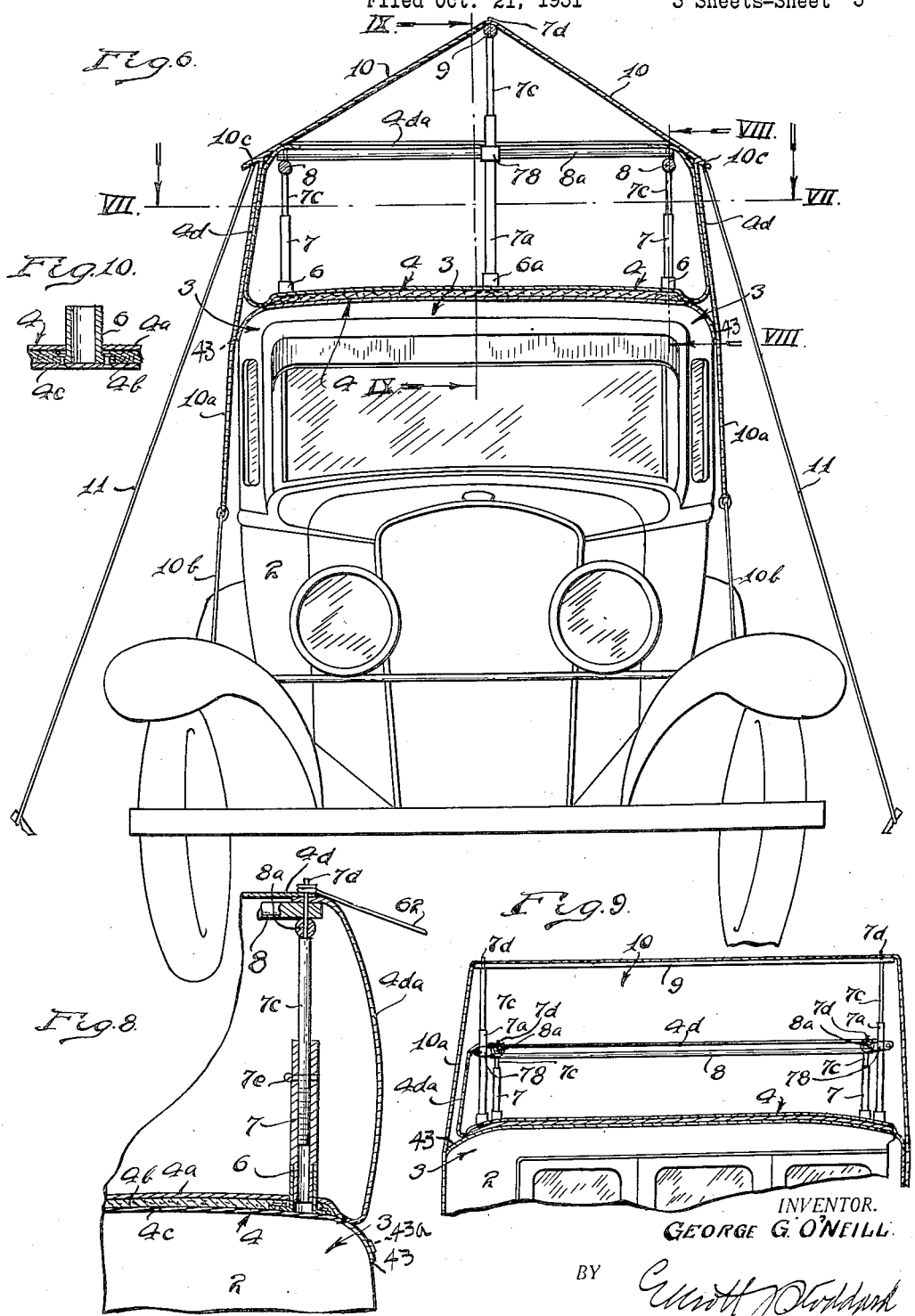
INVENTOR.
GEORGE G. O'NEILL
BY
ATTORNEY.

Patented May 8, 1934

1,958,169

UNITED STATES PATENT OFFICE 1,958,169

AUTOMOBILE

George G. O'Neill, St. Clair Shores, Mich.

Application October 21, 1931, Serial No. 570,163

7 Claims. (Cl. 5—119)

My invention relates to automobiles and a primary object of my improvements is to utilize the top of an automobile for sleeping purposes, incidentally a part of my invention provides for the storage and transportation of the baggage incident to an automobile trip.

In the accompanying drawings:—

Figure 1 is a perspective view of an automobile with apparatus embodying a portion of my invention arranged for holding the baggage.

Figure 2 is a detail section showing the apparatus at the top of the automobile in transverse section in the plane indicated by the lines and arrows II, II, Figure 1.

Figure 3 is a view showing the apparatus on the top of the automobile in longitudinal section in the plane indicated by the lines and arrows III, III, Figure 1.

Figure 4 is an elevation showing the upper front right hand corner with the top cover in section and stanchions engaged thereon.

Figure 6 is a front elevation with the apparatus upon the top of the automobile shown in vertical section, the tent and sustaining framework being in place.

Figure 8 is a detail section at the upper left hand corner of the automobile, as shown in Figure 6 and indicated by the arrows 8, 8.

Figure 9 is a longitudinal section on the line IX, IX, Figure 6, looking in the direction of the arrow.

Figure 10 is a detail section showing one of the retaining sockets for a tent stanchion.

Figure 5:
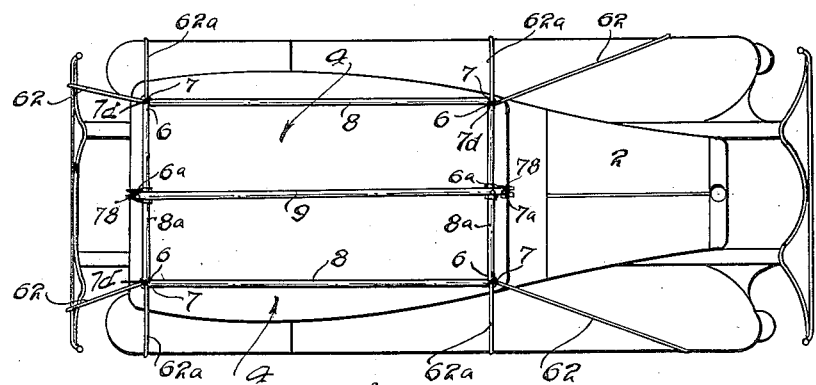
Figure 5 is a plan view showing the stanchions engaged thereon, with their connecting rods and stay ropes.
Figure 7:
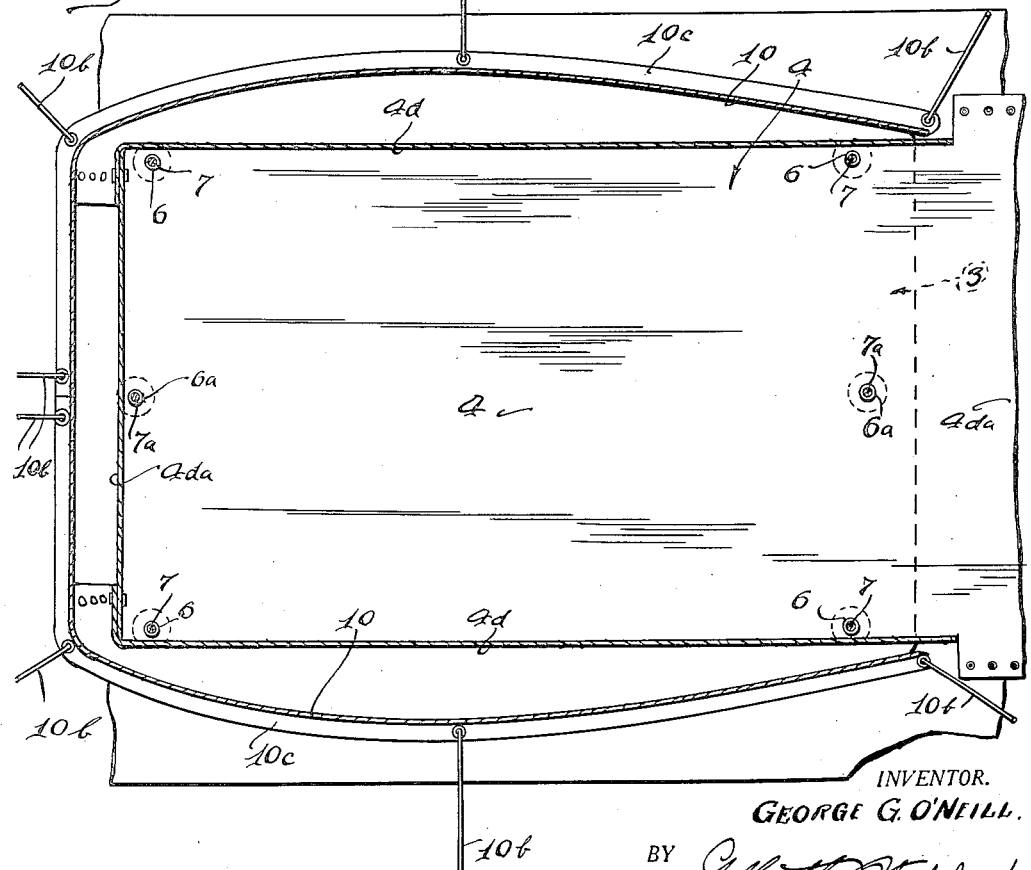
Figure 7 is a section on the line VII, VII, Figure 6, looking in the direction of the arrows.

2 is an automobile having a top 3. 4 is a blanket, or covering, of flexible material of considerable substance and thickness, adapted to extend over the upper surface of the top 3, and to distribute the pressure of any weight that may be laid thereon over a considerable area. I make this blanket, or covering, preferably of two outside layers 4a and 4c with an interposed layer or filling 4b. The sheet 4c is extended beyond the filling 4b and the covering sheet 4a, at the sides and ends of the covering 4 to form attaching strips 43 which may be secured by buttons or other conventional attachments 43a, around the edges of the top as indicated distinctly in Figure 1, to hold the covering 4 in place. Or, instead of using the buttons for an attaching means, stay ropes, indicated by broken lines 43b in Figure 1, may be used at intervals and secured to the fenders, or bumpers, or other parts of the automobile.

From the edges of the covering 4 extend the wings, or flaps, 4d of strong sheet material and of a width that when folded over on the top will extend about three fourths of the way across the top, so that the wing, or flap, on one side, when so folded over, shall lap over the wing upon the other side.

At the ends of the covering 4 I provide wings 4da (Fig. 3) which also lap over each other when folded over upon the top.

Incidentally I use the wings 4d, 4da for covering the baggage placed upon the top of the vehicle over the covering 4, as shown in Figures 1, 2 and 3, such wings being simply folded over the baggage and bound in place by ropes 5 and 5a (Fig. 1) secured to rings 5b, provided for that purpose, at the edge of the covering 4.

6, 6, 6, 6 are sockets, one of which is fixed at each corner of the covering 4 as shown most distinctly in Figure 10. 6a, 6a are sockets similar to the sockets 6 but located at the center and ends of the covering 4.

7 indicates stanchions one of which is placed in each of the sockets 6 and extends vertically therefrom. Each of the stanchions 7 is continued in a telescoping member 7c, which may be adjusted to different positions and secured in its adjusted position by a pin 7e (Fig. 8) passing through the walls of the hollow stanchion 7 and through the telescoping member 7c. 7d is a pintle extending axially upward from the upper end of the extension member 7c. 7a are stanchions similar to the stanchions 7 but of greater height, placed at the center and ends of the covering 4. 8, 8 are rods, one of which extends between the side stanchions 7, 7 at each side of the top, its ends engaging over the pintles 7d and 9 is a similar rod extending parallel to the rods 8, 8 midway between said rods its ends engaging over the pintle 7d at the top of the part 7c, extending from each of the stanchions 7a. 8a, 8a are transverse rods at the ends of the top, the ends of said rods engaging over the pintles 7d above the stanchions 7, the center of said rods being engaged by socket members 78 to the central stanchions 7a (Fig. 6).

62, 62a indicate pairs of stay ropes engaging over pintles 7d at each of the corners of the top and extending downward and secured to the fenders or other part of the automobile at the lower portion of the same. (Fig. 5).

10 (Fig. 6) is a canvas sheet, or tent, passing over the rod 9, and extending over the rods 8, 8 and downward in the parts 10a and secured by ropes 10b to the lower part of the automobile. 10c is a flap extending from each side of the covering portion of the tent 10. 11, 11 are guide ropes secured to the flaps 10c, their lower ends being secured to stakes driven into the ground.

When it is desired to use the top for sleeping purposes the flaps 4d and 4da are turned upward and secured to the pintles 7d in the position shown in Figure 6. The tent 10 is extended over the whole, as above described. In this position the framework and flaps 4d and 4da obviate any danger of falling and the tent 10 forms a shelter and protection from the weather.

The construction of the covering 4 enables the insertion of an interposed stiffening piece which shall distribute the load.

What I claim is:—

1. In combination with an automobile top, a cover for said top whereby the same is adapted to sleeping purposes and means for securing said cover in position, said cover being provided with sockets adapted to receive upwardly extending stanchions and stanchions adapted to engage in said sockets for the purpose described.

2. In combination with an automobile top, a cover for said top whereby the same is adapted to sleeping purposes and means for securing said cover in position, said cover being provided with sockets adapted to receive upwardly extending stanchions and stanchions adapted to fit into said sockets for the purpose described, and horizontal rods attached to said stanchions.

3. In combination with an automobile top, a cover for said top means for securing said cover in position, said cover being adapted to receive and engage an adjustable framework and a framework adapted to be adjusted to position on said cover and removable therefrom at will, means for extending said framework adapted to support a tent, and a tent supported on said framework extending means and extending over the flaps when engaged with the framework said cover being provided with flaps extending from its edges adapted to engage said framework, and a tent extending over said framework.

4. In combination with an automobile top, a cover for said top means for securing said cover in position, said cover being adapted to receive and engage an adjustable framework and a framework adapted to be adjusted to position on said cover and removable therefrom at will, said cover being provided with flaps extending from its edges adapted to engage said framework, and a tent extending over said framework, and engaging the same.

5. The combination of a blanket adapted to sleeping purposes, said blanket being provided with sockets adapted to receive upwardly extending stanchions, and stanchions adapted to engage in said sockets for the purpose described.

6. The combination of a blanket adapted to sleeping purposes, said blanket being provided with sockets adapted to receive upwardly extending stanchions, and stanchions adapted to engage in said sockets for the purpose described, and horizontal rods attached to said stanchions.

7. In combination with an automobile top, a flexible cover lying upon said top, said cover consisting of two outside layers with an interposed filling layer, said interposed layer being adapted to distribute a pressure brought upon said cover over a considerable area of said top, one outside layer being extended in a narrow strip and adapted to secure said cover to said top and the other outer layer being extended at each of its sides to form a flap adapted to be folded upward and over the cover for the purpose described.

GEORGE G. O'NEILL.